(12) United States Patent
Lee et al.

(10) Patent No.: US 12,100,351 B2
(45) Date of Patent: Sep. 24, 2024

(54) DC-DC CONVERTER AND DISPLAY DEVICE HAVING THE SAME

(71) Applicant: Samsung Display Co., Ltd., Yongin-Si (KR)

(72) Inventors: Yoon Young Lee, Yongin-si (KR); Sungchun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/132,785

(22) Filed: Apr. 10, 2023

(65) Prior Publication Data
US 2024/0071304 A1 Feb. 29, 2024

(30) Foreign Application Priority Data
Aug. 23, 2022 (KR) .................. 10-2022-0105815

(51) Int. Cl.
G09G 3/3233 (2016.01)
H02M 3/145 (2006.01)

(52) U.S. Cl.
CPC .......... *G09G 3/3233* (2013.01); *H02M 3/145* (2013.01); *G09G 2330/028* (2013.01)

(58) Field of Classification Search
CPC .. G06F 3/04166; G06F 3/0412; G06F 3/0446; G09G 3/3677; G09G 2300/0426; G09G 2300/0842; G09G 2300/0861; G09G 2320/0204; G09G 2320/041
See application file for complete search history.

(56) References Cited

U.S. PATENT DOCUMENTS

| | | | | |
|---|---|---|---|---|
| 2011/0141098 A1* | 6/2011 | Yaguma | ............... | G09G 3/3696 345/212 |
| 2018/0212513 A1* | 7/2018 | Park | .................... | G09G 3/2092 |
| 2021/0281175 A1* | 9/2021 | Han | ..................... | H02M 1/08 |
| 2024/0036675 A1* | 2/2024 | Jeon | ..................... | G06F 3/0446 |

FOREIGN PATENT DOCUMENTS

KR 10-0218375 B1 9/1999

* cited by examiner

*Primary Examiner* — Sahlu Okebato
(74) *Attorney, Agent, or Firm* — Innovation Counsel LLP

(57) ABSTRACT

A DC-DC converter includes a first switching element, a second switching element, a first amplifier, a second amplifier, a Pulse Width Modulation (PWM) controller, an output inductor and a power compensator. The second switching element is connected to the first switching element. The first amplifier outputs a first switching control signal to control the first switching element. The second amplifier outputs a second switching control signal to control the second switching element. The PWM controller generates a control signal applied to input terminals of the first amplifier and the second amplifier. The output inductor includes a first terminal connected to the first switching element and the second switching element and a second terminal outputting the pixel power supply voltage. The power compensator receives an input voltage and adjusts a power supply voltage applied to a power supply terminal of the first amplifier.

18 Claims, 11 Drawing Sheets

DC-DC CONVERTER AND DISPLAY DEVICE HAVING THE SAME

This application claims priority to Korean Patent Application No. 10-2022-0105815, filed on Aug. 23, 2022, and all the benefits accruing therefrom under 35 U.S.C. § 119, the content of which in its entirety is herein incorporated by reference.

BACKGROUND

1. Field

Embodiments of the present inventive concept relate to a DC-DC converter and a display device having the same. More particularly, embodiments of the present inventive concept relate to a DC-DC converter and a display device having the same capable of reducing power loss when an input voltage changes.

2. Description of the Related Art

A display device includes a DC-DC converter converting a battery voltage into a DC voltage for a display panel. The battery voltage is gradually increasing for a higher capacity.

In addition, with a development of a high-capacity battery technology, an adapter voltage is also increasing due to a demand for a higher battery voltage range or a high-speed charging.

Meanwhile, due to an increase in the battery voltage and the adapter voltage, an input voltage of the DC-DC converter increases, a power supply voltage applied to a power supply terminal of an amplifier constituting the DC-DC converter increases, and a power loss of the amplifier increases. Therefore, the entire power loss of the DC-DC converter may increase.

SUMMARY

Embodiments of the present inventive concept provide a DC-DC converter which reduces power loss even when an input voltage of the DC-DC converter increases.

Embodiments of the present inventive concept provide a DC-DC converter which reduces power loss even when an input voltage of the DC-DC converter increases and which operates normally even when the power supply voltage of an amplifier of the DC-DC converter is low.

In an embodiment of a DC-DC converter configured to supply a pixel power supply voltage to a display panel according to the present inventive concept, the DC-DC converter includes a first switching element, a second switching element, a first amplifier, a second amplifier, a Pulse Width Modulation controller, an output inductor and a power compensator. The second switching element is connected to the first switching element. The first amplifier is configured to output a first switching control signal to control the first switching element. The second amplifier is configured to output a second switching control signal to control the second switching element. The Pulse Width Modulation controller is configured to generate a control signal applied to input terminals of the first amplifier and the second amplifier. The output inductor includes a first terminal connected to the first switching element and the second switching element and a second terminal outputting the pixel power supply voltage. A power compensator is configured to receive an input voltage and to adjust a power supply voltage applied to a power supply terminal of the first amplifier.

In an embodiment, when the power supply voltage decreases, a power loss of the first amplifier may decrease.

In an embodiment, the power compensator may include a first transistor including a first terminal configured to receive the input voltage, a second terminal connected to a first diode, and a gate terminal connected to a second node, a second transistor including a first terminal configured to receive the pixel power supply voltage, a second terminal connected to a second diode, and a gate terminal configured to receive a reference gate voltage, a third transistor including a first terminal connected to the second node, a second terminal connected to a second resistor, and a gate terminal configured to receive the pixel power supply voltage, the first diode including a first terminal connected to the first transistor and a second terminal connected to a third node, the second diode including a first terminal connected to the second transistor and a second terminal connected to the third node, a reference gate voltage generator configured to receive the input voltage, to generate the reference gate voltage, and to apply the reference gate voltage to a first node, a first resistor including a first terminal connected to the first node and a second terminal connected to the second node and the second resistor including a first terminal connected to the third transistor and a second terminal configured to receive a ground voltage.

In an embodiment, when the reference gate voltage increases from less than a second reference voltage to more than the second reference voltage, the second transistor may be turned on.

In an embodiment, when the second transistor is turned on, the power supply voltage may decrease.

In an embodiment, when the pixel power supply voltage increases from less than a third reference voltage to more than the third reference voltage, the third transistor may be turned on.

In an embodiment, when the third transistor is turned on, a voltage of the second node may decrease.

In an embodiment, the voltage of the second node may be determined by a voltage distribution according to a serial connection of the first resistor and the second resistor.

In an embodiment, when the voltage of the second node decreases from more than a first reference voltage to less than the first reference voltage, the first transistor is turned off.

In an embodiment of a DC-DC converter configured to supply a pixel power supply voltage to a display panel according to the present inventive concept, the DC-DC converter includes a first switching element, a second switching element, a first amplifier, a second amplifier, a Pulse Width Modulation controller, an output inductor and a power compensator. The second switching element is connected to the first switching element. The first amplifier is configured to output a first switching control signal to control the first switching element. The second amplifier is configured to output a second switching control signal to control the second switching element. The Pulse Width Modulation controller is configured to generate a control signal applied to input terminals of the first amplifier and the second amplifier. The output inductor including a first terminal connected to the first switching element and the second switching element and a second terminal configured to output the pixel power supply voltage. The power compensator is configured to receive an input voltage and to adjust a power supply voltage applied to a power supply terminal of the first amplifier. The power compensator includes a first transistor including a first terminal configured to receive the input voltage, a second terminal connected to a first diode, and a gate terminal connected to a second node, a second transistor including a first terminal configured to receive the pixel power supply voltage, a second terminal connected to a second diode, and a gate terminal configured to receive a reference gate voltage, a third transistor including a first terminal connected to the second node, a second terminal connected in series with a second resistor, and a gate terminal configured to receive the pixel power supply voltage, a fourth transistor including a first terminal connected to the second resistor, a second terminal configured to receive a ground voltage, and a gate terminal configured to receive a driving control voltage, the first diode including a first terminal connected to the first transistor and a second terminal connected to a third node, the second diode including a first terminal connected to the second transistor and a second terminal connected to the third node, a reference gate voltage generator configured to receive the input voltage, generate the reference gate voltage, and to apply the generated reference gate voltage to a first node, a first resistor including a first terminal connected to the first node and a second terminal connected to the second node and a second resistor including a first terminal connected to the third transistor and a second terminal connected to the fourth transistor.

In an embodiment, the driving control voltage may be adjusted according to the pixel power voltage.

In an embodiment, when the pixel power supply voltage increases from less than a fourth reference voltage to more than the fourth reference voltage, the fourth transistor may be turned on in response to the driving control voltage.

In an embodiment, when the pixel power supply voltage increases from less than a third reference voltage to more than the third reference voltage, the third transistor may be turned on.

In an embodiment, when the third transistor is turned on, a voltage of the second node may decrease.

In an embodiment, the voltage of the second node may be determined by a voltage distribution according to a serial connection of the first resistor and the second resistor.

In an embodiment, when the voltage of the second node decreases from more than a first reference voltage to less than the first reference voltage, the first transistor may be turned off.

In n embodiment, when the pixel power supply voltage increases from less than a fourth reference voltage to more than the fourth reference voltage, the fourth transistor may be turned on.

In an embodiment of a display device according to the present inventive concept, the display device includes a display panel, a data driver, a gate driver, a driving controller, a DC-DC converter. The display panel is configured to display an image based on a pixel power supply voltage. The data driver is configured to output a data voltage to the display panel. The gate driver configured to output a gate signal to the display panel. The driving controller configured to control the data driver and the gate driver. The DC-DC converter is configured to supply the pixel power supply voltage to the display panel, the DC-DC converter includes a first switching element, a second switching element connected to the first switching element, a first amplifier configured to output a first switching control signal to control the first switching element, a second amplifier configured to output a second switching control signal to control the second switching element, a Pulse Width Modulation controller configured to generate a control signal applied to input terminals of the first amplifier and the second amplifier, an output inductor including a first terminal connected to the first switching element and the second switching element and a second terminal configured to output the pixel power supply voltage and a power compensator configured to adjust a power supply voltage applied to a power supply terminal of the first amplifier.

In an embodiment, when the power supply voltage decreases, a power loss of the first amplifier may decrease.

In an embodiment, the power compensator may include a first transistor including a first terminal configured to receive the input voltage, a second terminal connected to a first diode, and a gate terminal connected to a second node, a second transistor including a first terminal configured to receive the pixel power supply voltage, a second terminal connected to a second diode, and a gate terminal configured to receive a reference gate voltage, a third transistor including a first terminal connected to the second node, a second terminal connected to a second resistor, and a gate terminal configured to receive the pixel power supply voltage, the first diode including a first terminal connected to the first transistor and a second terminal connected to a third node, the second diode including a first terminal connected to the second transistor and a second terminal connected to the third node, a reference gate voltage generator configured to receive the input voltage, to generate the reference gate voltage, and to apply the reference gate voltage to a first node, a first resistor including a first terminal connected to the first node and a second terminal connected to the second node and the second resistor including a first terminal connected to the third transistor and a second terminal configured to receive a ground voltage.

According to such a DC-DC converter and a display device including the same, the DC-DC converter may include a first converter, the first converter may include a power compensator, and the power compensator may generate a compensation voltage by in parallel or selectively receiving an input voltage of the first converter and a pixel power supply voltage, the power compensator may apply the compensation voltage to a high power supply terminal of a first amplifier, and a power loss of the DC-DC converter may decreases.

In addition, even when the compensation voltage applied to the high power supply terminal of the first amplifier decreases below a certain voltage, in order for the first amplifier to operate normally, when the pixel power supply voltage decreases from more than a fourth reference voltage to less than the fourth reference voltage, the power compensator may receive the input voltage more than the pixel power supply voltage of the first converter.

BRIEF DESCRIPTION OF THE DRAWINGS

The above and other features and advantages of the disclosure will become more apparent by describing in detailed embodiments thereof with reference to the accompanying drawings.

DETAILED DESCRIPTION OF THE INVENTIVE CONCEPT

Hereinafter, the present inventive concept will be explained in detail with reference to the accompanying drawings.

Figure 1:
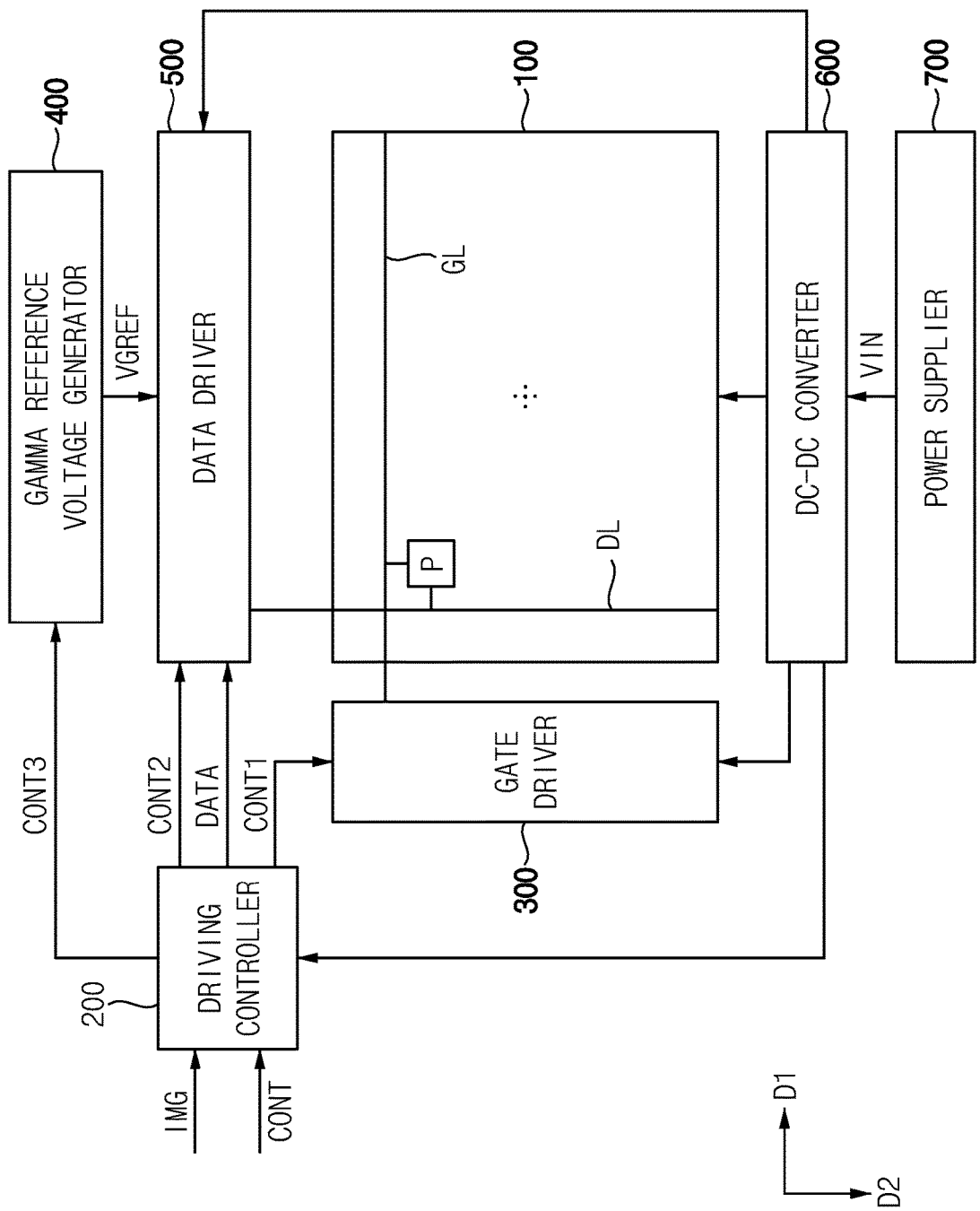
FIG. 1 is a block diagram illustrating a display device according to an embodiment of the disclosure.

FIG. 1 is a block diagram illustrating a display device according to an embodiment of the disclosure;

Referring to FIG. 1, a display device includes a display panel 100 and a display panel driver. The display panel driver includes a driving controller 200, a gate driver 300, a gamma reference voltage generator 400, and a data driver 500. The display device may further include a DC-DC converter 600.

For example, the driving controller 200 and the data driver 500 may be integrally formed. For example, the driving controller 200, the gamma reference voltage generator 400, and the data driver 500 may be integrally formed. For example, the driving controller 200, the gate driver 300, the gamma reference voltage generator 400 and the data driver 500 may be integrally formed. For example, the driving controller 200, the gate driver 300, the gamma reference voltage generator 400, the data driver 500 and the DC-DC converter 600 may be integrally formed.

The display panel 100 includes a display region displaying an image and a peripheral region disposed adjacent to the display region.

For example, the display panel 100 may be a liquid crystal display panel containing a liquid crystal. Alternatively, the display panel 100 may be an organic light emitting diode display panel including an organic light emitting diode.

The display panel 110 includes gate lines GL, data lines DL, and pixels P electrically connected to the gate lines GL and the data lines DL. The gate lines GL extend in a first direction D1, and the data lines DL extend in a second direction D2 crossing the first direction D1, e.g., perpendicularly.

In addition, the display panel 100 receives a pixel power supply voltage ELVDD and a low pixel power supply voltage ELVSS from the DC-DC converter 600. The pixel power supply voltage ELVDD may be applied to a first terminal of the organic light emitting diode of the pixels P. The low pixel power supply voltage ELVSS may be applied to a second terminal of the organic light emitting diode of the pixels P. A pixel structure of the display panel 100 will be described in detail with reference to FIG. 2.

The driving controller 200 receives the input image data IMG and the input control signal CONT. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400, and outputs the third control signal CONT3 to the gamma reference voltage generator 400.

The gate driver 300 generates gate signals driving the gate lines GL in response to the first control signal CONT1 received from the driving controller 200. The gate driver 300 outputs gate signals to the gate lines GL. For example, the gate driver 300 may sequentially output the gate signals to the gate lines GL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to the data signal DATA.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltage VGREF from the gamma reference voltage generator 400. The data driver 500 converts the data signal DATA into an analog data voltage using the gamma reference voltage VGREF. The data driver 500 outputs the data voltage to the data line DL.

The DC-DC converter 600 outputs power supply voltages corresponding to the driving controller 200, the gate driver 300 and the data driver 500. For example, the DC-DC converter 600 may generate a logic voltage of the driving controller 200. For example, the DC-DC converter 600 may generate a gate-on voltage and a gate-off voltage of the gate driver 300. For example, the DC-DC converter 600 may generate a data power supply voltage of the data driver 500. For example, the DC-DC converter 600 may generate a common voltage and a storage voltage of the display panel 100.

The DC-DC converter 600 may receive an input voltage VIN from a power supplier 700 and generate the pixel power supply voltage ELVDD and the low pixel power supply voltage ELVSS. The DC-DC converter 600 may provide the pixel power supply voltage ELVDD and the low pixel power supply voltage ELVSS to the display panel 100.

The pixel power supply voltage ELVDD may be applied to the first terminal of the organic light emitting diode OLED of the pixel P, and the low pixel power supply voltage ELVSS may be applied to the second terminal of the organic light emitting diode OLED. For example, the pixel power supply voltage ELVDD may be greater than the low pixel power supply voltage ELVSS.

The DC-DC converter 600 will be described in detail with reference to FIGS. 3 to 11.

Figure 2:
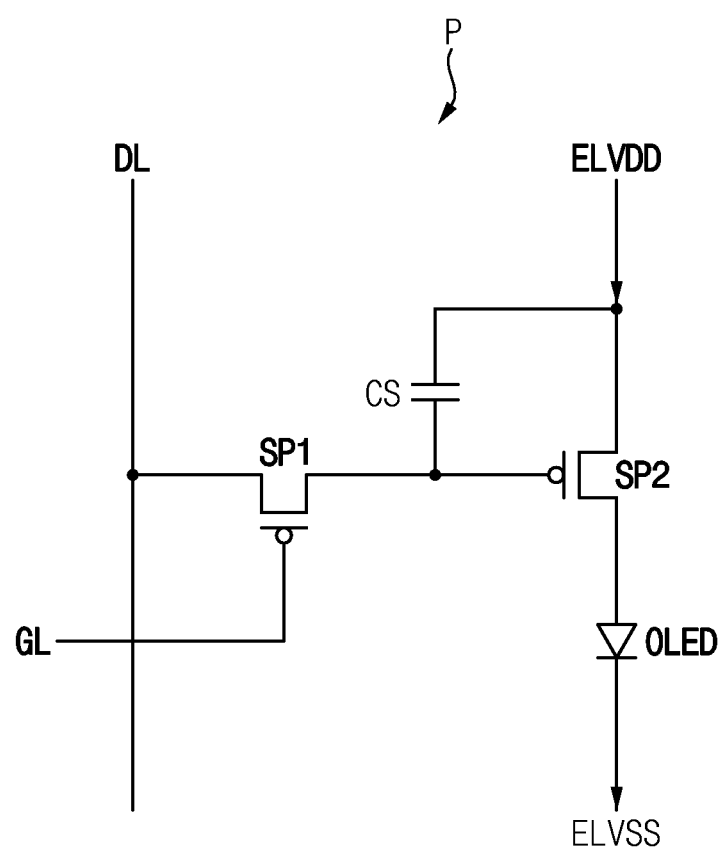
FIG. 2 is a circuit diagram illustrating a pixel structure of a display panel of FIG. 1.

FIG. 2 is a circuit diagram illustrating a pixel structure of a display panel 100 of FIG. 1.

Referring to FIGS. 1 and 2, the pixel P may include a first pixel switching element SP1, a second pixel switching element SP2, a storage capacitor CS and an organic light emitting diode OLED.

The first pixel switching element SP1 may be a thin film transistor. The first pixel switching element SP1 may include a gate terminal connected to the gate line GL, an input terminal connected to the data line DL, and an output terminal connected to a gate terminal of the second pixel switching element SP2.

The input terminal of the first pixel switching element SP1 may be a source terminal. The output terminal of the first pixel switching element SP1 may be a drain terminal.

The second pixel switching element SP2 may include the gate terminal connected to the output terminal of the first pixel switching element SP1, an input terminal to which the pixel power supply voltage ELVDD is applied, and an output terminal connected to the first terminal of the organic light emitting element OLED.

The second pixel switching element SP2 may be a thin film transistor. The input terminal of the second pixel switching element SP2 may be a source terminal. The output terminal of the second pixel switching element SP2 may be a drain terminal.

The first terminal of the storage capacitor CS may be connected to the input terminal of the second pixel switching element SP2, and the second terminal of the storage capacitor CS may be connected to the output terminal of the first pixel switching element SP1.

The first terminal of the organic light emitting diode OLED may be connected to the output terminal of the second pixel switching element SP2, and the low pixel power supply voltage ELVSS may be applied to the second terminal of the organic light emitting diode OLED.

The first terminal of the organic light emitting diode OLED may be an anode terminal. The second terminal of the organic light emitting diode OLED may be a cathode terminal.

The pixel P may receive the gate signal, the data voltage, the pixel power supply voltage ELVDD, and the low pixel power supply voltage ELVSS, and display an image by emitting light from the organic light emitting diode OLED with a luminance corresponding to the data voltage.

As shown in FIG. 2, the first pixel switching element SP1 and the second pixel switching element SP2 may be p-channel metal oxide semiconductor (PMOS) transistors. However, the first pixel switching element SP1 and the second pixel switching element PT2 may be n-channel metal oxide semiconductor (NMOS) transistors in an embodiment.

Figure 3:
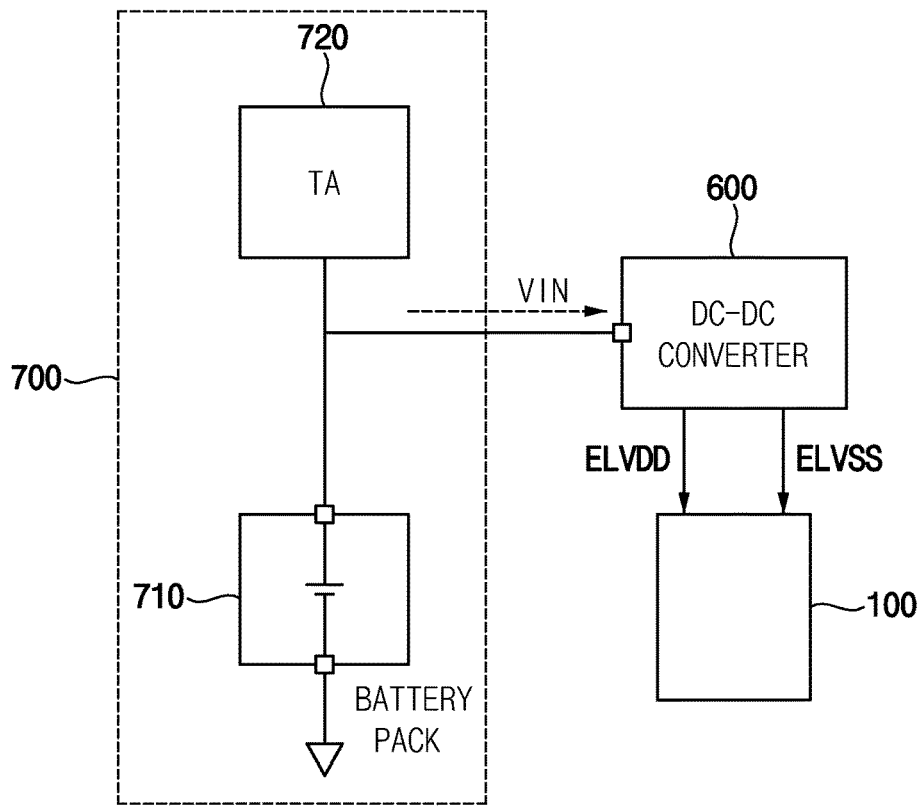
FIG. 3 is a block diagram illustrating a DC-DC converter, a power supplier, and the display panel of FIG. 1.
Figure 4:
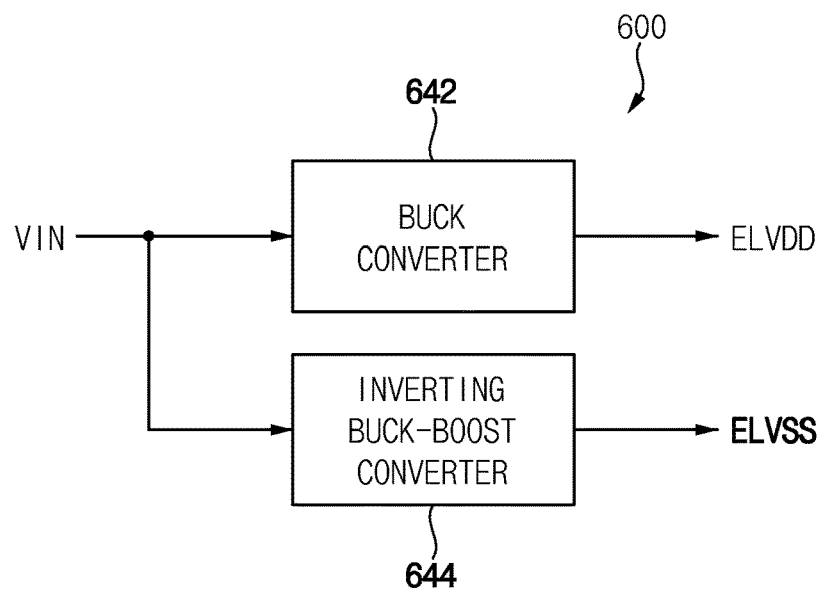
FIG. 4 is a block diagram illustrating the DC-DC converter of FIG. 3.

FIG. 3 is a block diagram illustrating the DC-DC converter 600, the power supplier 700, and the display panel 100 of FIG. 1. FIG. 4 is a block diagram illustrating the DC-DC converter 600 of FIG. 3.

Referring now to FIGS. 1 to 4, the DC-DC converter 600 may be connected to an adapter TA 720 or a battery pack 710. The adapter TA 720 or the battery pack 710 provide the input voltage VIN. The DC-DC converter 600 may receive the input voltage VIN. The input voltage VIN may vary, e.g., depending upon the number of battery cells of the battery pack 710.

For example, when the DC-DC converter 600 is connected to two battery cells of the battery pack 710, a minimum voltage of the input voltage VIN may be about 5.5V. For example, when the DC-DC converter 600 is connected to the two battery cells of the battery pack 710, a maximum voltage of the input voltage VIN may be about 9V. For example, when the DC-DC converter 600 is connected to three battery cells of the battery pack 710, a maximum voltage of the input voltage VIN may be about 13.5V. For example, when the DC-DC converter 600 is connected to four battery cells of the battery pack 710, a maximum voltage of the input voltage VIN may be about 18V. For example, when the DC-DC converter 600 is connected to the adapter TA 720 and the four battery cells of the battery pack 710, a maximum voltage of the input voltage VIN may be about 21V. For example, a range of the input voltage VIN may be 5.5V to 21V.

The DC-DC converter 600 may include a first converter 642 generating the pixel power supply voltage ELVDD based on the input voltage VIN and a second converter 644 generating the low pixel power supply voltage based on the input voltage VIN.

For example, the first converter 642 may be a buck converter. For example, the second converter 644 may be an inverting buck-boost converter.

Figure 5:
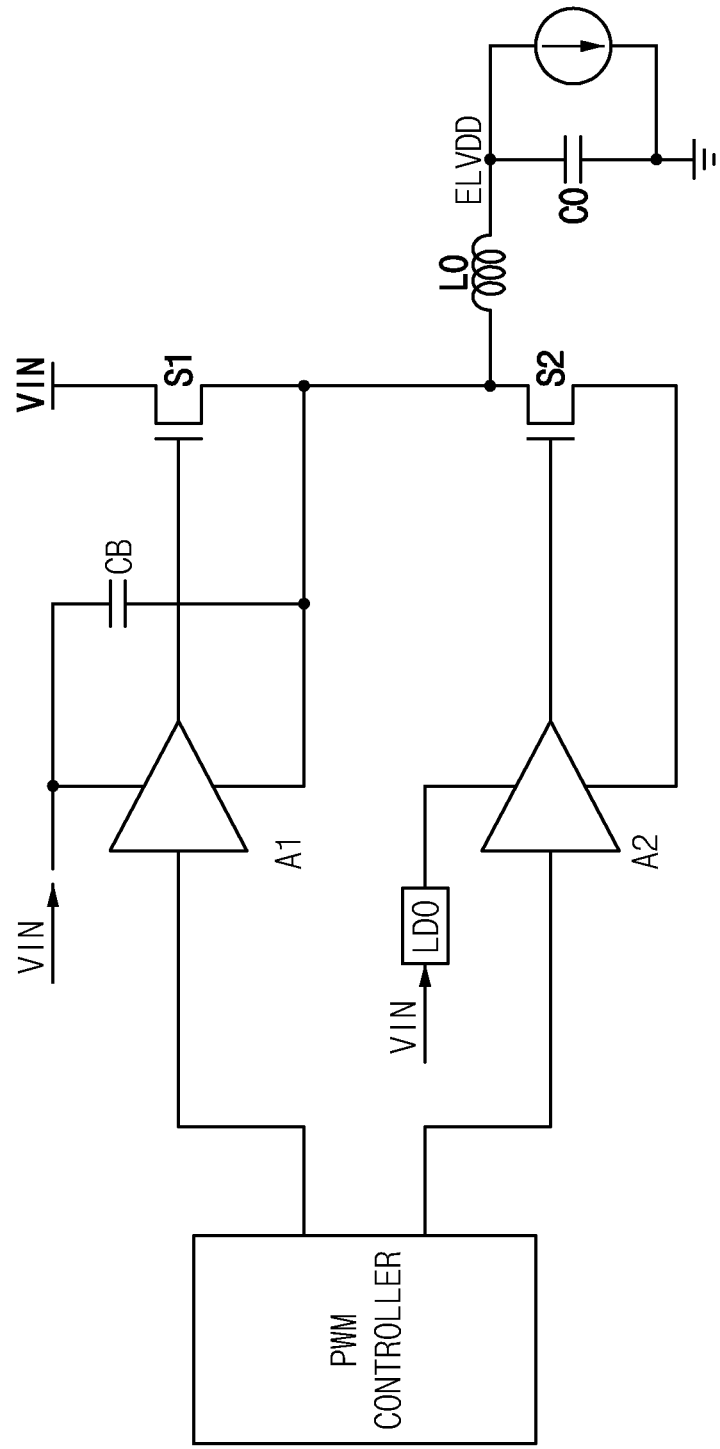
FIG. 5 is a circuit diagram explaining an operation of a first converter of FIG. 4.
Figure 6:
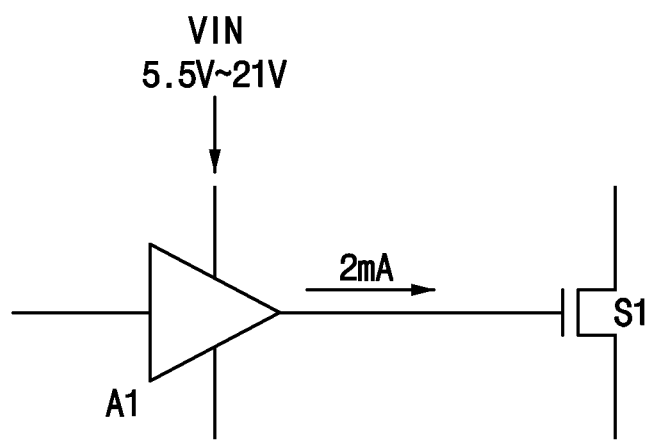
FIG. 6 is a conceptual diagram explaining a power loss of the first amplifier of FIG. 5.

FIG. 5 is a circuit diagram explaining an operation of a first converter 642 of FIG. 4. FIG. 6 is a conceptual diagram explaining a power loss of a first amplifier A1 of FIG. 5.

Referring to FIG. 5, the first converter 642 may include a first switching element S1, a second switching element S2, a first amplifier A1, a second amplifier A2, a low dropout regulator LDO, an output inductor LO, a boot capacitor CB, an output capacitor CO, and a PWM (Pulse Width Modulation) controller.

A first terminal of the first switching element S1 may receive the input voltage VIN. The second terminal of the first switching element S1 may be connected to a second terminal of the boot capacitor CB, a low power supply terminal of the first amplifier A1, a first terminal of the second switching element S2 and a first terminal of the output inductor LO. A gate terminal of the first switching element S1 may be connected to an output terminal of the first amplifier A1. For example, the first switching element S1 may be a thin film transistor.

The first terminal of the second switching element S2 may be connected to the second terminal of the first switching element S1, the second terminal of the boot capacitor CB, the low power supply terminal of the first amplifier A1 and the first terminal of the output inductor LO. A second terminal of the second switching element S2 may be connected to a low power supply terminal of the second amplifier A2. A gate terminal of the second switching element S2 may be connected to an output terminal of the second amplifier A2. For example, the second switching element S2 may be a thin film transistor.

An output terminal of the first amplifier A1 may be connected to the gate terminal of the first switching element S1. A high power supply terminal of the first amplifier A1 may receive the input voltage VIN. The low power supply terminal of the first amplifier A1 may be connected to the second terminal of the boot capacitor CB, the second terminal of the first switching element S1, the first terminal of the output inductor LO and the first terminal of the switching element S2. An input terminal of the first amplifier A1 may be connected to the PWM controller.

An output terminal of the second amplifier A2 may be connected to the gate terminal of the second switching element S2. A high power supply terminal of the second amplifier A2 may be connected to the low dropout regulator LDO. The low power supply terminal of the second amplifier A2 may be connected to the second terminal of the second switching element S2. An input terminal of the second amplifier A2 may be connected to the PWM controller.

The low dropout regulator LDO may receive the input voltage VIN. The low dropout regulator LDO may apply a voltage obtained by dropping the input voltage VIN to the high power supply terminal of the second amplifier A2.

The first terminal of the output inductor LO may be connected to the low power supply terminal of the first amplifier A1, the second terminal of the boot capacitor CB, the second terminal of the first switching element S1 and the first terminal of the second switching element S2. A second terminal of the output inductor LO may be connected to a first terminal of the output capacitor CO and a current source, and a voltage of the second terminal of the output inductor LO may be the pixel power supply voltage ELVDD.

The PWM controller may be connected to the input terminal of the first amplifier A1 and the input terminal of the second amplifier A2.

The first amplifier A1 may operate by receiving the input voltage VIN through the high power supply terminal. The first amplifier A1 may receive a control signal generated by the PWM controller, output a first switching control signal, and apply the first switching control signal to the gate terminal of the first switching element S1. Accordingly, the first switching element S1 may be controlled by the first switching control signal. For example, the first switching element S1 may be turn on and turn off repeatedly by the first switching control signal.

The second amplifier A2 may receive a control signal generated by the PWM controller, output a second switching control signal, and apply the second switching control signal to the gate terminal of the second switching element S2. Accordingly, the second switching element S2 may be controlled by the second switching control signal. For example, the second switching element S2 may be turned on and turned off repeatedly by the second switching control signal.

When the first switching element S1 is turned on, the second switching element S2 is turned off, and when the first switching element S1 is turned off, the second switching element S2 is turned on.

When the first switching element S1 is turned on and the second switching element S2 is turned off, current may flow through the output inductor LO and energy may be stored.

When the first switching element S1 is turned off and the second switching element S2 is turned on, energy stored in the output inductor LO may be output.

Meanwhile, when the high power supply terminal of the first amplifier A1 directly receives the input voltage VIN of the DC-DC converter 600 and the input voltage VIN applied to the high power supply terminal of the first amplifier A1 increases, the power loss of the first amplifier A1 may increase.

For example, when the input voltage VIN applied to the first converter 642 is 5.5V and an output current of the first amplifier A1 is 2 mA, the power loss of the first amplifier A1 may be 11 mW. For example, when the input voltage VIN applied to the first converter 642 is 21V and the output current of the first amplifier A1 is 2 mA, the power loss of the first amplifier A1 may be 42 mW. That is, when the input voltage VIN increases, a high power supply voltage applied to the high power terminal of the first amplifier A1 may increase, and the power loss of the first amplifier A1 may increase.

Specifically, the input voltage VIN of the DC-DC converter 600 may increase due to an increase in the battery voltage and the adapter voltage, the high power supply voltage applied to the high power supply terminal of the first amplifier A1 constituting the DC-DC converter 600 may increase, and the power loss of the first amplifier A1 increases, resulting in an overall increase in power loss of the DC-DC converter 600. Thus, as the power loss of the first amplifier A1 increases, the power loss of the DC-DC converter 600 as a whole may increase.

To prevent this problem, the first converter 642 may further include a power compensator 646 as discussed below which controls a high power supply voltage VA1 applied to the high power supply terminal of the first amplifier A1 even when the input voltage VIN increases.

Figure 7:
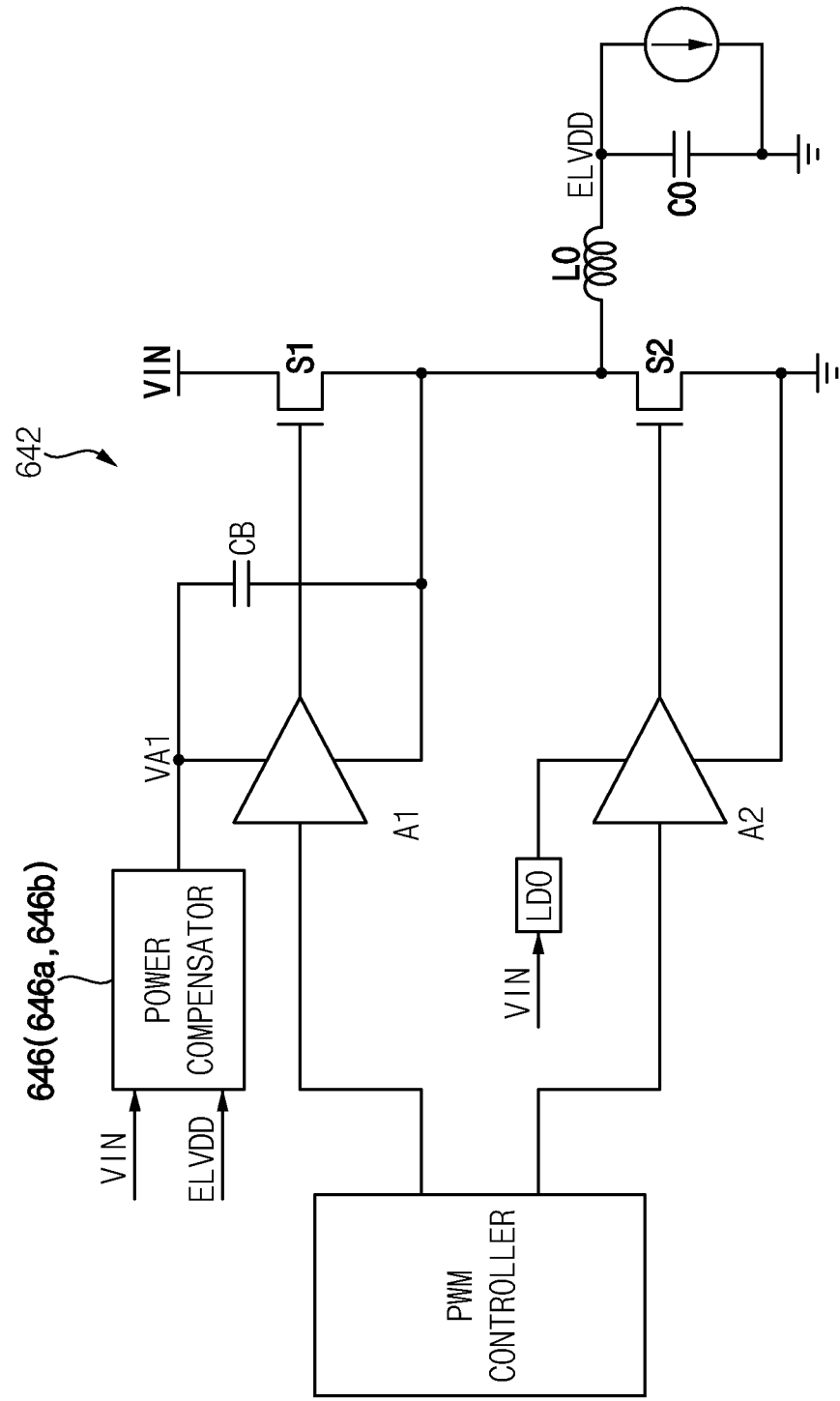
FIG. 7 is a block diagram illustrating the first converter according to an embodiment of the present inventive concept.
Figure 8:
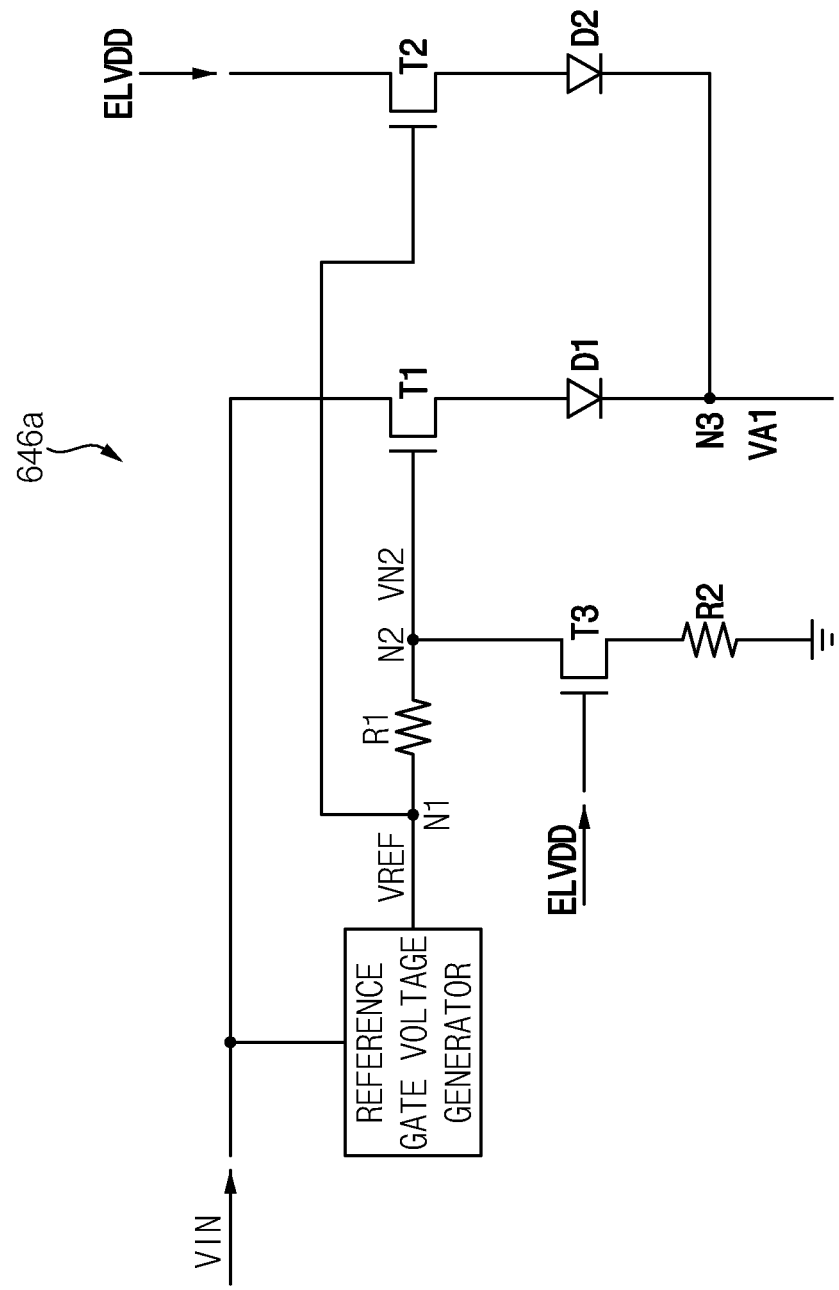
FIG. 8 is a circuit diagram illustrating an example of a circuit of a power compensator of FIG. 7.
Figure 9:
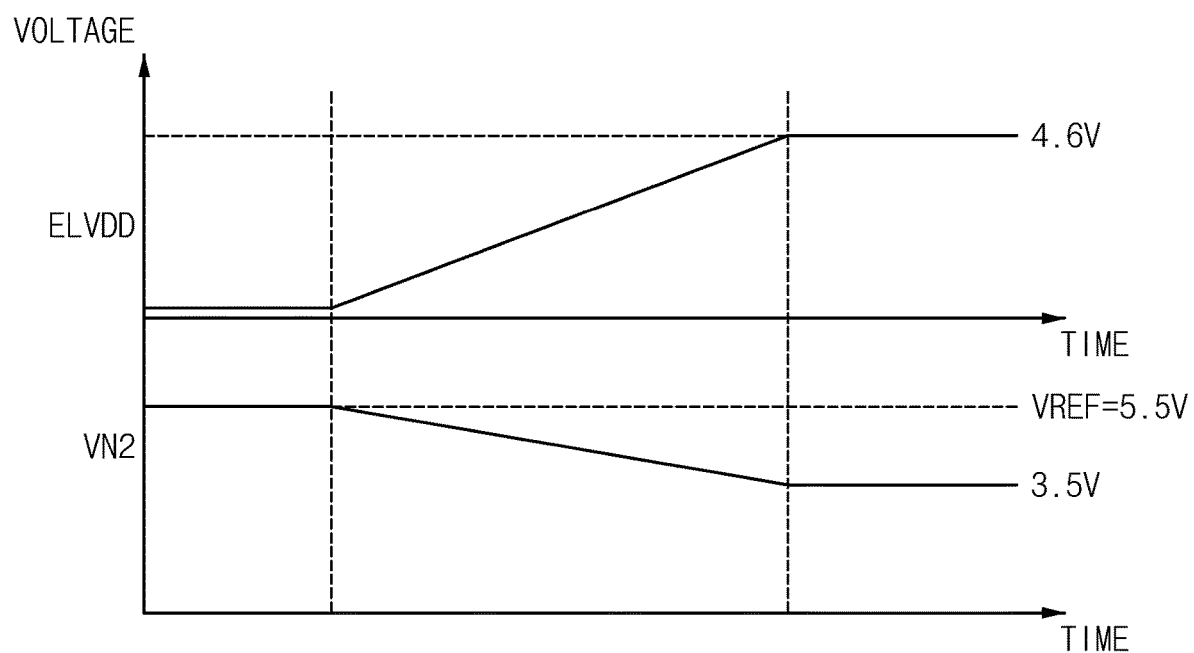
FIG. 9 is a graph illustrating an example of a pixel power supply voltage and a voltage of a second node of FIG. 8.

FIG. 7 is a block diagram illustrating the first converter 642 according to an embodiment of the present inventive concept. FIG. 8 is a circuit diagram illustrating an example of a circuit of the power compensator 646 of FIG. 7. FIG. 9 is a graph illustrating an example of the pixel power supply voltage ELVDD and a voltage VN2 of a second node N2 of FIG. 8.

Referring to FIGS. 1 to 9, the first converter 642 may further include a power compensator 646a which controls the high power supply voltage VA1 applied to the high power supply terminal of the first amplifier A1 even when the input voltage VIN increases. The power compensator 646a may generate a compensation voltage, i.e., the high power supply voltage VA1, by receiving the input voltage VIN and the pixel power supply voltage ELVDD. The power compensator 646a may output the compensating voltage to the high power supply terminal of the first amplifier A1.

In an embodiment, the power compensator 646a may include a first transistor T1, a second transistor T2, a third transistor T3, a reference gate voltage generator, a first resistor R1 and a second resistor R2. The power compensator 646a may further include a first diode D1 and a second diode D2.

The first transistor T1 may include a first terminal receiving the input voltage VIN, a second terminal connected to the first diode D1, and a gate terminal connected to the second node N2. The second transistor T2 may include a first terminal receiving the pixel power supply voltage ELVDD, a second terminal connected to the second diode D2, and a gate terminal receiving a reference gate voltage VREF. The third transistor T3 may include a first terminal connected to the second node N2, a second terminal connected to the second resistor R2, and a gate terminal receiving the pixel power supply voltage ELVDD. The first diode D1 may include a first terminal connected to the first transistor T1 and a second terminal connected to the third node N3. The second diode D2 may include a first terminal connected to the second transistor T2 and a second terminal connected to the third node N3. The reference gate voltage generator may receive the input voltage VIN, generate the reference gate voltage VREF, and apply the generated reference gate voltage VREF to the first node N1. The first resistor R1 may include a first terminal connected to the first node N1 and a second terminal connected to the second node N2. The second resistor R2 may include a first terminal connected to the third transistor T3 and a second terminal receiving a ground voltage.

The DC-DC converter 600 may be connected to the adapter TA 720 and the battery pack 710 to receive the input voltage VIN. The power compensator 646a may receive the input voltage VIN and the pixel power supply voltage ELVDD, and generate the compensation voltage. The reference gate voltage generator may receive the input voltage VIN, generate the reference gate voltage VREF, and apply the generated reference gate voltage VREF to the first node N1.

Specifically, the power compensator 646a may receive the input voltage VIN of the first converter 642 and the pixel power supply voltage ELVDD in parallel or selectively, generate the compensating voltage, apply the compensating voltage to the high power supply terminal of the first amplifier A1, and the power loss of the DC-DC converter 600 may decrease.

For example, before the first converter 642 operates, the pixel power supply voltage ELVDD may be 0 V. A voltage of the first node N1 applied to the gate terminal of the second transistor T2 may be the reference gate voltage VREF. When the voltage of the first node N1 is more than a second reference voltage, the second transistor T2 may be turned on.

The second reference voltage may be a reference voltage for turning the second transistor T2 from turn-on to turn-off or from the turn-off to the turn-on. For example, the second transistor T2 may be turned on when a voltage applied to the gate terminal of the second transistor T2 increases from less than the second reference voltage to more than the second reference voltage. For example, the second transistor T2 may be turned off when the voltage applied to the gate terminal of the second transistor T2 decreases from more than the second reference voltage to less than the second reference voltage.

When the second transistor T2 is turned on and the pixel power supply voltage ELVDD applied to a first terminal of the second transistor T2 is 0 V, the compensation voltage when the power compensator 646a receives the pixel power supply voltage ELVDD may not be applied to the high power supply terminal of the first amplifier A1.

When the pixel power voltage ELVDD is 0 V, the third transistor T3 is turned off because the pixel power voltage ELVDD applied to a gate terminal of the third transistor T3 is less than the third reference voltage. When the third transistor T3 is turned off, a current flowing between the first node N1 and the second node N2 may be 0A. Accordingly, when the third transistor T3 is turned off, the voltage of the first node N1 and the voltage VN2 of the second node N2 may be the reference gate voltage VREF.

The reference gate voltage VREF may be more than the first reference voltage. When the voltage VN2 of the second node N2 is more than the first reference voltage, the first transistor T1 may be turned on.

The first reference voltage may be a reference voltage for turning the first transistor T1 from turn-on to turn-off or from the turn-off to the turn-on. For example, the first transistor T1 may be turned on when a voltage applied to the gate terminal of the first transistor T1 increases from less than the first reference voltage to more than the first reference voltage. For example, the first transistor T1 may be turned off when the voltage applied to the gate terminal of the first transistor T1 decreases from more than the first reference voltage to less than the first reference voltage.

When the first transistor T1 is turned on and the second transistor T2 is turned off, the compensation voltage when the power compensator 646a receives the input voltage VIN may be applied to the high power supply terminal of the first amplifier A1 and the compensation voltage when the power compensator 646a receives the pixel power supply voltage ELVDD may not be applied to the high power supply terminal of the first amplifier A1.

When the voltage applied to the gate terminal of the first transistor T1 is more than the first reference voltage, the first transistor T1 may be turned on. When the voltage applied to the gate terminal of the first transistor T1 decreases from more than the first reference voltage to less than the first reference voltage, the first transistor T1 may be turned off.

When the voltage applied to the gate terminal of the second transistor T2 is more than the second reference voltage, the second transistor T2 may be turned on. When the voltage applied to the gate terminal of the second transistor T2 decreases from more than the second reference voltage to less than the second reference voltage, the second transistor T2 may be turned off.

When a voltage applied to the gate terminal of the third transistor T3 is greater than or equal to the third reference voltage, the third transistor T3 may be turned on.

The third reference voltage may be a reference voltage for turning the third transistor T3 from turn-on to turn-off or from the turn-off to the turn-on. For example, the third transistor T3 may be turned on when a voltage applied to the gate terminal of the third transistor T3 increases from less than the third reference voltage to more than the third reference voltage. For example, the third transistor T3 may be turned off when the voltage applied to the gate terminal of the third transistor T3 decreases from more than the third reference voltage to less than the third reference voltage.

When the voltage applied to the gate terminal of the third transistor T3 decreases from greater than or equal to the third reference voltage to less than the third reference voltage, the third transistor T3 may be turned off.

For example, when the first converter 642 operates, the pixel power supply voltage ELVDD may gradually increase to 0 V or higher. In this case, when the pixel power supply voltage ELVDD applied to the gate terminal of the third transistor T3 increases from less than the third reference voltage to more than the third reference voltage, the third transistor T3 may be turned on.

When the third transistor T3 is turned on, the current flowing between the first node N1 and the second node N2 may not be 0A. When the third transistor T3 is turned on, the voltage VN2 of the second node N2 may be determined by voltage distribution according to a series connection of the first resistor R1 and the second resistor R2. In this case, the voltage VN2 of the second node N2 may decreases and may be smaller than the voltage of the first node N1, but the voltage VN2 of the second node N2 may be more than the first reference voltage. Since the voltage VN2 of the second node N2 applied to the gate terminal of the first transistor T1 is more than the first reference voltage, the first transistor T1 may be turned on.

When the first transistor T1 and the second transistor T2 are turned on, the high power supply terminal of the first amplifier A1 may receive the compensation voltage when the power compensator 646a receives the input voltage VIN may be applied to the high power supply terminal of the first amplifier A1 and the compensation voltage when the power compensator 646a receives the pixel power supply voltage ELVDD.

When the second transistor T2 is turned on, the high power supply voltage of the first amplifier A1 may be less than the compensation voltage when the power compensator 646a receives only the input voltage VIN.

For example, when the first converter 642 operates, the pixel power supply voltage ELVDD may increase to about 4.6V. In this case, since the pixel power supply voltage ELVDD applied to the gate terminal of the third transistor T3 is more than the third reference voltage, the third transistor T3 may be turned on.

When the third transistor T3 is turned on, the current flowing between the first node N1 and the second node N2 may not be OA. Therefore, when the third transistor T3 is turned on, the voltage VN2 of the second node N2 may be determined by voltage distribution according to the series connection of the first resistor R1 and the second resistor R2. In this case, the voltage VN2 of the second node N2 may be less than the voltage of the first node N1 and may be less than the second reference voltage. When the voltage VN2 of the second node N2 applied to the gate terminal of the first transistor T1 decreases from more than the first reference voltage to less than the first reference voltage, the first transistor T1 may be turned off.

The voltage of the first node N1 applied to the gate terminal of the second transistor T2 may be the reference gate voltage VREF. When the voltage of the first node N1 is more than the second reference voltage, the second transistor T2 may be turned on. When the second transistor T2 is turned on, the compensation voltage when the power compensator 646a receives the pixel power supply voltage ELVDD may applied to the high power supply terminal of the first amplifier A1.

As such, before the first converter 642 operates, the pixel power supply voltage ELVDD may be 0 V, and the compensation voltage when the power compensator 646a receives the input voltage VIN may be selectively applied to the high power supply terminal of the first amplifier A1.

When the first converter 642 operates, the pixel power supply voltage ELVDD may gradually increase, and the compensation voltage when the power compensator 646a receives the input voltage VIN and the compensation voltage when the power compensator 646a receives the pixel power supply voltage ELVDD may be in parallel applied to the high power supply terminal of the first amplifier A1. In this case, the high power supply voltage VA1 of the first amplifier A1 may gradually decrease.

When the first converter 642 operates, the pixel power supply voltage ELVDD may increase to about 4.6 V, and the compensation voltage when the power compensator 646a receives the input voltage VIN may not applied to the high power supply terminal of the first amplifier A1 but the compensation voltage when the power compensator 646a receives the pixel power supply voltage ELVDD may be selectively applied to the high power supply terminal of the first amplifier A1. In this case, the high power supply voltage VA1 of the first amplifier A1 may be less than the high power supply voltage VA1 when the power compensator 646a selectively receives the input voltage VIN and the high power supply voltage VA1 when the power compensator 646a selectively in parallel receives the input voltage VIN and the pixel power supply voltage ELVDD.

That is, the high power supply voltage VA1 applied to the high power supply terminal of the first amplifier A1 may gradually decrease. Accordingly, the power loss of the first amplifier A1 may gradually decrease. Even if the input voltage VIN increases, the power loss of the DC-DC converter 600 may be reduced.

Figure 10:
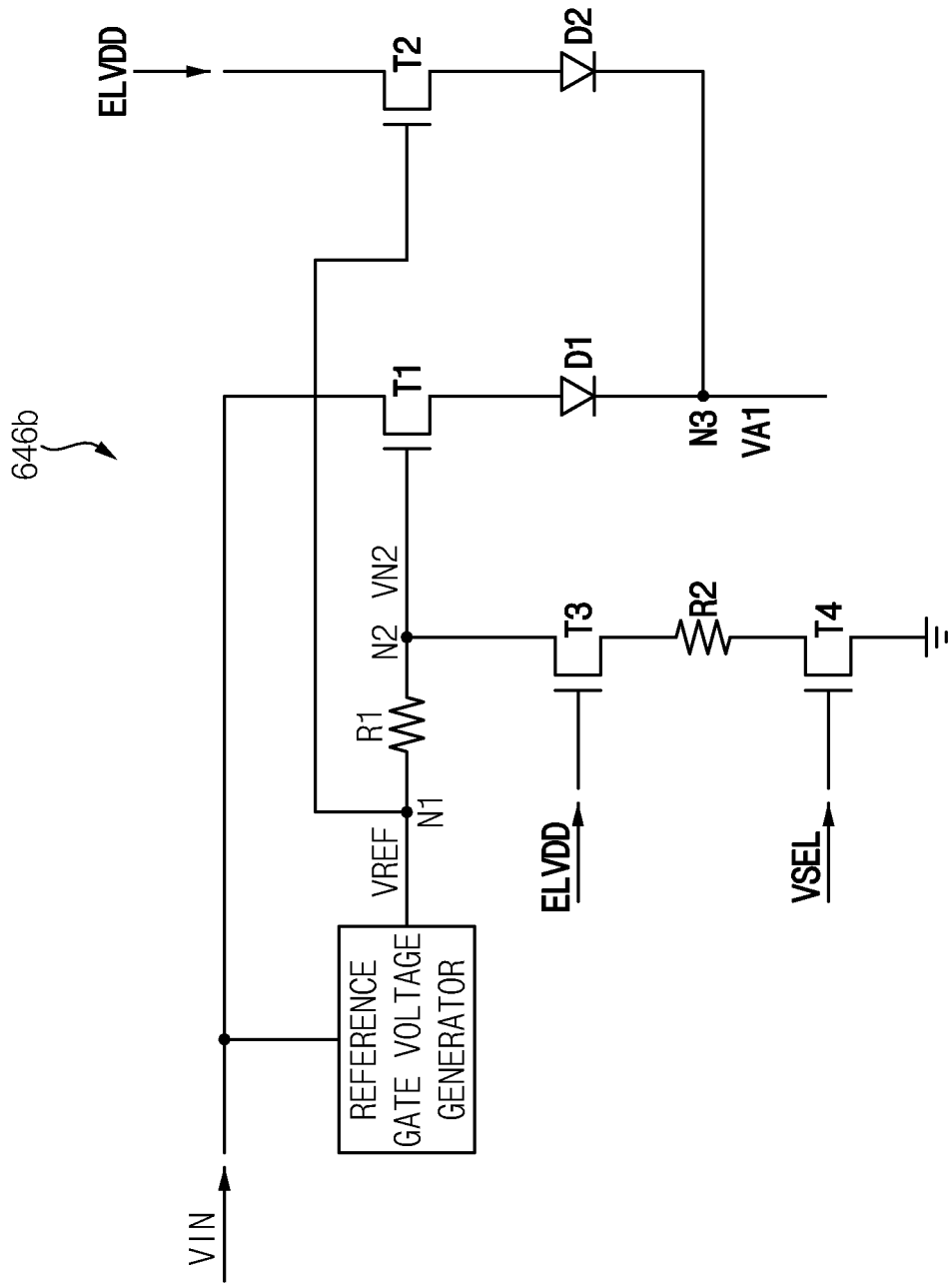
FIG. 10 is a circuit diagram illustrating another example of the circuit of the power compensator of FIG. 7.
Figure 11:
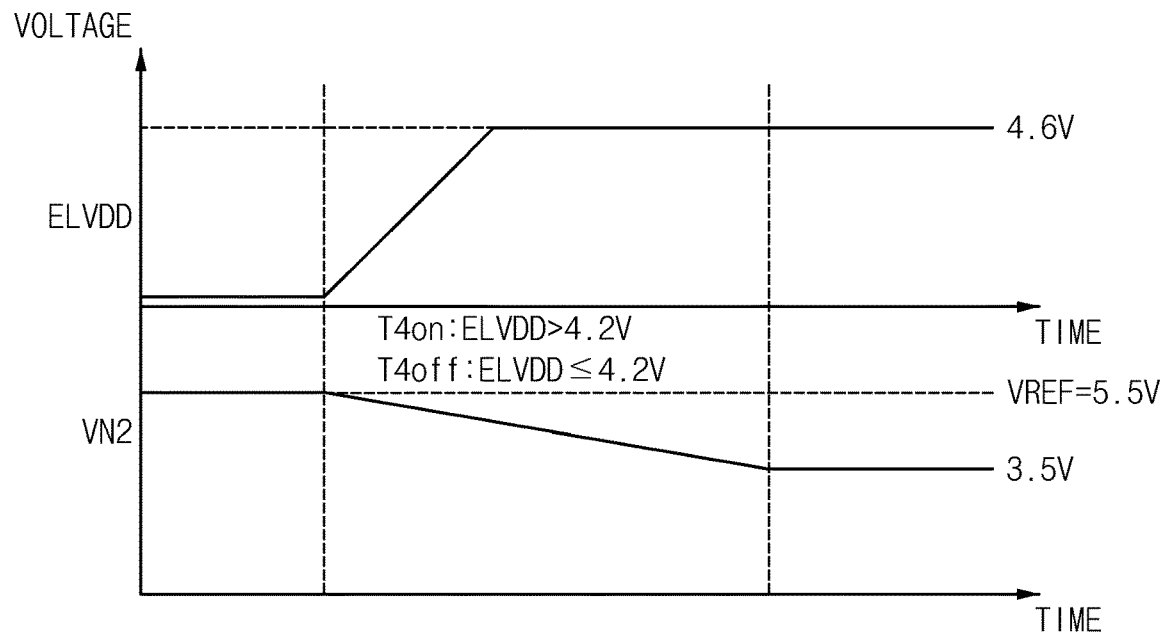
FIG. 11 is a graph illustrating an example of a pixel power supply voltage and a voltage of a second node of FIG. 10.

FIG. 10 is a circuit diagram illustrating another example of the circuit of the power compensator 646 of FIG. 7. FIG. 11 is a graph illustrating an example of the pixel power supply voltage ELVDD and the voltage VN2 of the second node N2 of FIG. 10.

Referring to FIGS. 1 to 7, 10 and 11, the first converter 642 may further include a power compensator 646b which controls a high power supply voltage VA1 applied to the high power supply terminal of the first amplifier A1 even when the input voltage VIN increases. The power compensator 646b may generate a compensation voltage, i.e., the high power supply voltage VA1, by receiving the input voltage VIN and the pixel power supply voltage ELVDD. The power compensator 646b may output the compensating voltage to the high power supply terminal of the first amplifier A1.

In an embodiment, the power compensator 646b may include a first transistor T1, a second transistor T2, a third transistor T3, a fourth transistor T4, a first diode D1, a second diode D2, a reference gate voltage generator, a first resistor R1 and a second resistor R2.

The first transistor T1 may include a first terminal receiving the input voltage VIN, a second terminal connected to the first diode D1, and a gate terminal connected to a second node N2. The second transistor T2 may include a first terminal receiving the pixel power supply voltage ELVDD, a second terminal connected to the second diode D2, and a gate terminal receiving a reference gate voltage VREF. The third transistor T3 may include a first terminal connected to the second node N2, a second terminal connected to the second resistor R2, and a gate terminal receiving the pixel power supply voltage ELVDD. The fourth transistor T4 may include a first terminal connected to the second resistor R2, a second terminal receiving a ground voltage, and a gate terminal receiving a driving control voltage VSEL. The first diode D1 may include a first terminal connected to the first transistor T1 and a second terminal connected to a third node N3. The second diode D2 may include a first terminal connected to the second transistor T2 and a second terminal connected to the third node N3. The reference gate voltage generator may receive the input voltage VIN, generate a reference gate voltage VREF, and apply the generated reference gate voltage VREF to the first node N1. The first resistor R1 may include a first terminal connected to the first node N1 and a second terminal connected to the second node N2. The second resistor R2 may include a first terminal connected to the third transistor T3 and a second terminal connected to the fourth transistor T4.

The DC-DC converter including the power compensator 646a of FIG. 8 and the DC-DC converter including the power compensator 646b of FIG. 10 may be the same except that the DC-DC converter including the power compensator 646b of FIG. 10 further include the fourth transistor T4. Therefore, same reference numerals are used for the same or corresponding components, and duplicate descriptions are omitted.

Meanwhile, when the first converter 642 operates, the high power supply voltage VA1 applied to a high power terminal of the first amplifier A1 may gradually decrease from a compensation voltage when the power compensator 646b receives the input voltage VIN to a compensation voltage when the power compensator 646b receives the pixel power supply voltage ELVDD.

When the high power supply voltage VA1 of the first amplifier A1 may less than a certain voltage, the first amplifier A1 may not operate normally. Accordingly, the driving control voltage VSEL may be adjusted according to the pixel power supply voltage ELVDD. When the pixel power supply voltage ELVDD decreases from more than a fourth reference voltage, e.g., 4.2 V, to less than the fourth reference voltage in order for the first amplifier A1 to operate normally, the fourth transistor T4 may be turned off in response to the driving control voltage VSEL.

When the pixel power supply voltage ELVDD is more than the fourth reference voltage, the fourth transistor T4 may be turned on in response to the driving control voltage VSEL. When the pixel power voltage ELVDD decreases from more than the fourth reference voltage to less than the fourth reference voltage, the fourth transistor T4 may be turned off in response to the driving control voltage VSEL.

When the pixel power supply voltage ELVDD decreases from more than the fourth reference voltage to less than the fourth reference voltage, a current flowing between the first node N1 and the second node N2 may be OA. Accordingly, a voltage of the first node N1 and the voltage VN2 of the second node N2 may be the reference gate voltage VREF.

The reference gate voltage VREF may be more than the first reference voltage and the second reference voltage. When the voltage of the first node N1 and the voltage VN2 of the second node N2 are more than the first reference voltage and the second reference voltage, the first transistor T1 and the second transistor T2 may be turned on. When the first transistor T1 and the second transistor T2 are turned on, the compensation voltage when the power compensator 646b receives the input voltage VIN and the compensation voltage when the power compensator 646b receives the pixel power supply voltage ELVDD may be applied to the high power supply terminal of the first amplifier A1.

Therefore, when the first converter 642 operates, the high power supply voltage VA1 of the first amplifier A1 may gradually decrease, and when the high power supply voltage VA1 of the first amplifier A1 decreases below a certain voltage, the first amplifier A1 may not operate normally. Therefore, when the pixel power supply voltage ELVDD decreases from more than the fourth reference voltage to less than the fourth reference voltage, the fourth transistor T4 may turned off. The compensation voltage when the power compensator 646b receives the input voltage VIN and the compensation voltage when the power compensator 646b receives the pixel power supply voltage ELVDD may be applied to the high power supply terminal of the first amplifier A1 and the first amplifier A1 may operate normally.

Figure 12:
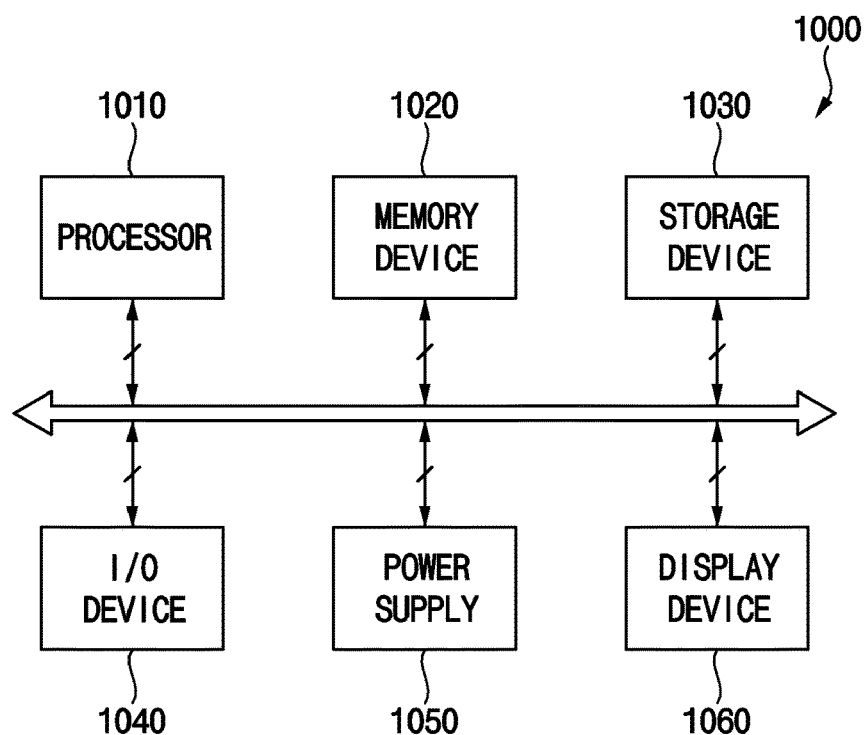
FIG. 12 is a block diagram illustrating an electronic device according to embodiment of the present inventive concept.
Figure 13:
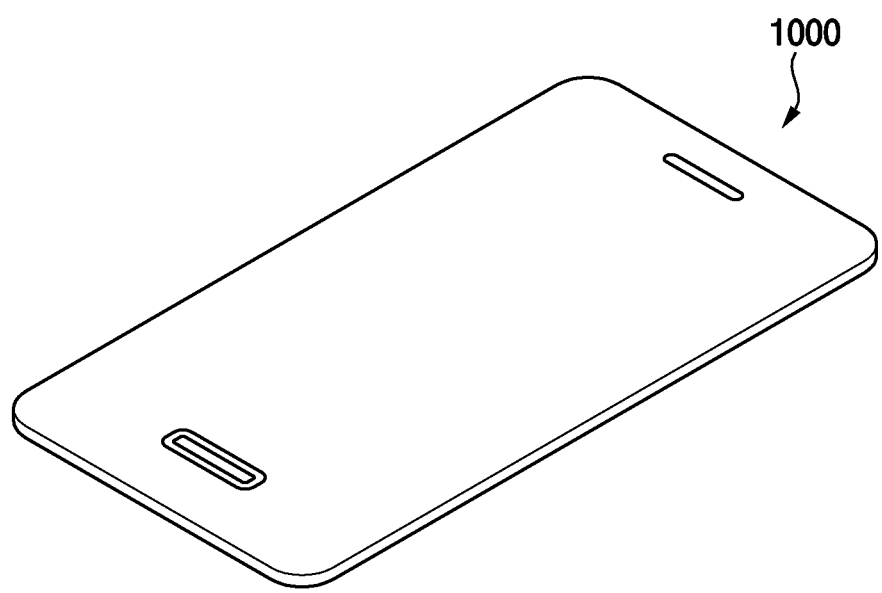
FIG. 13 is a diagram illustrating an example in which the electronic device of FIG. 12 is implemented as a smart phone.

FIG. 12 is a block diagram illustrating an electronic device 1000 according to embodiment of the present inventive concept. FIG. 13 is a diagram illustrating an example in which the electronic device 1000 of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus (USB) device, other electronic device, and the like. In an embodiment, as illustrated in FIG. 13, the electronic device 1000 may be implemented as a smart phone. However, the electronic device 1000 may be implemented as a cellular phone, a video phone, a smart pad, a smart watch, a tablet PC, a car navigation system, a computer monitor, a laptop, a head mounted display (HMD) device, and the like in an embodiment.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A DC-DC converter configured to supply a pixel power supply voltage to a display panel, the DC-DC converter comprising:
    a first switching element;
    a second switching element connected to the first switching element;
    a first amplifier configured to output a first switching control signal to control the first switching element;
    a second amplifier configured to output a second switching control signal to control the second switching element;
    a Pulse Width Modulation controller configured to generate a control signal applied to input terminals of the first amplifier and the second amplifier;
    an output inductor including a first terminal connected to the first switching element and the second switching element, and a second terminal configured to output the pixel power supply voltage; and
    a power compensator configured to receive an input voltage, and to adjust a power supply voltage applied to a power supply terminal of the first amplifier, wherein the power compensator includes:
    a first transistor including a first terminal configured to receive the input voltage, a second terminal connected to a first diode, and a gate terminal connected to a second node;
    a second transistor including a first terminal configured to receive the pixel power supply voltage, a second terminal connected to a second diode, and a gate terminal configured to receive a reference gate voltage;
    a third transistor including a first terminal connected to the second node, a second terminal connected to a second resistor, and a gate terminal configured to receive the pixel power supply voltage;
    the first diode including a first terminal connected to the first transistor and a second terminal connected to a third node;
    the second diode including a first terminal connected to the second transistor and a second terminal connected to the third node;
    a reference gate voltage generator configured to receive the input voltage, to generate the reference gate voltage, and to apply the reference gate voltage to a first node;
    a first resistor including a first terminal connected to the first node and a second terminal connected to the second node; and
    the second resistor including a first terminal connected to the third transistor and a second terminal configured to receive a ground voltage.

2. The DC-DC converter of claim 1, wherein, when the power supply voltage decreases, a power loss of the first amplifier decreases.

3. The DC-DC converter of claim 1, wherein, when the reference gate voltage increases from less than a second reference voltage to more than the second reference voltage, the second transistor is turned on.

4. The DC-DC converter of claim 3, wherein, when the second transistor is turned on, the power supply voltage decreases.

5. The DC-DC converter of claim 1, wherein, when the pixel power supply voltage increases from less than a third reference voltage to more than the third reference voltage, the third transistor is turned on.

6. The DC-DC converter of claim 5, wherein, when the third transistor is turned on, a voltage of the second node decreases.

7. The DC-DC converter of claim 6, wherein the voltage of the second node is determined by a voltage distribution according to a serial connection of the first resistor and the second resistor.

8. The DC-DC converter of claim 1, wherein, when the voltage of the second node decreases from more than a first reference voltage to less than the first reference voltage, the first transistor is turned off.

9. A DC-DC converter configured to supply a pixel power supply voltage to a display panel, the DC-DC converter comprising:
    a first switching element;
    a second switching element connected to the first switching element;
    a first amplifier configured to output a first switching control signal to control the first switching element;
    a second amplifier configured to output a second switching control signal to control the second switching element;
    a Pulse Width Modulation controller configured to generate a control signal applied to input terminals of the first amplifier and the second amplifier;
    an output inductor including a first terminal connected to the first switching element and the second switching element and a second terminal configured to output the pixel power supply voltage; and
    a power compensator configured to receive an input voltage and to adjust a power supply voltage applied to a power supply terminal of the first amplifier;
    wherein the power compensator includes:
    a first transistor including a first terminal configured to receive the input voltage, a second terminal connected to a first diode, and a gate terminal connected to a second node;
    a second transistor including a first terminal configured to receive the pixel power supply voltage, a second terminal connected to a second diode, and a gate terminal receiving a reference gate voltage;
    a third transistor including a first terminal connected to the second node, a second terminal connected in series with a second resistor, and a gate terminal configured to receive the pixel power supply voltage;
    a fourth transistor including a first terminal connected to the second resistor, a second terminal configured to receive a ground voltage, and a gate terminal configured to receive a driving control voltage;
    the first diode including a first terminal connected to the first transistor and a second terminal connected to a third node;
    the second diode including a first terminal connected to the second transistor and a second terminal connected to the third node;
    a reference gate voltage generator configured to receive the input voltage, to generate the reference gate voltage, and to apply the generated reference gate voltage to a first node;
    a first resistor including a first terminal connected to the first node and a second terminal connected to the second node; and
    a second resistor including a first terminal connected to the third transistor and a second terminal connected to the fourth transistor.

10. The DC-DC converter of claim 9, wherein the driving control voltage is adjusted according to the pixel power voltage.

11. The DC-DC converter of claim 10, wherein when the pixel power supply voltage increases from less than a fourth reference voltage to more than the fourth reference voltage, the fourth transistor is turned on in response to the driving control voltage.

12. The DC-DC converter of claim 9, wherein when the pixel power supply voltage increases from less than a third reference voltage to more than the third reference voltage, the third transistor is turned on.

13. The DC-DC converter of claim 12, wherein when the third transistor is turned on, a voltage of the second node decreases.

14. The DC-DC converter of claim 13, wherein the voltage of the second node is determined by a voltage distribution according to a serial connection of the first resistor and the second resistor.

15. The DC-DC converter of claim 9, wherein when the voltage of the second node decreases from more than a first reference voltage to less than the first reference voltage, the first transistor is turned off.

16. The DC-DC converter of claim 9, when the pixel power supply voltage increases from less than a fourth reference voltage to more than the fourth reference voltage, the fourth transistor is turned on.

17. A display device comprising:
a display panel configured to display an image based on a pixel power supply voltage;
a data driver configured to output a data voltage to the display panel;
a gate driver configured to output a gate signal to the display panel;
a driving controller configured to control the data driver and the gate driver; and
a DC-DC converter configured to supply the pixel power supply voltage to the display panel, wherein
the DC-DC converter includes:
 a first switching element;
 a second switching element connected to the first switching element;
 a first amplifier configured to output a first switching control signal to control the first switching element;
 a second amplifier configured to output a second switching control signal to control the second switching element;
 a Pulse Width Modulation controller configured to generate a control signal applied to input terminals of the first amplifier and the second amplifier;
 an output inductor including a first terminal connected to the first switching element and the second switching element and a second terminal configured to output the pixel power supply voltage; and
 a power compensator configured to adjust a power supply voltage applied to a power supply terminal of the first amplifier, wherein
the power compensator includes:
a first transistor including a first terminal configured to receive the input voltage, a second terminal connected to a first diode, and a gate terminal connected to a second node;
a second transistor including a first terminal configured to receive the pixel power supply voltage, a second terminal connected to a second diode, and a gate terminal configured to receive a reference gate voltage;
a third transistor including a first terminal connected to the second node, a second terminal connected to a second resistor, and a gate terminal configured to receive the pixel power supply voltage;
the first diode including a first terminal connected to the first transistor and a second terminal connected to a third node;
the second diode including a first terminal connected to the second transistor and a second terminal connected to the third node;
a reference gate voltage generator configured to receive the input voltage, to generate the reference gate voltage, and to apply the reference gate voltage to a first node;
a first resistor including a first terminal connected to the first node and a second terminal connected to the second node; and
the second resistor including a first terminal connected to the third transistor and a second terminal configured to receive a ground voltage.

18. The display device of claim 17, wherein when the power supply voltage decreases, a power loss of the first amplifier decreases.

* * * * *